Inventor:
Roy J. Armbrust
By: Darbo, Robertson & Vandenburgh
Attys.

United States Patent Office 3,518,887
Patented July 7, 1970

3,518,887
FLOW-SENSING APPARATUS
Roy J. Armbrust, 2S501 Oaklawn,
Glen Ellyn, Ill. 60137
Filed Mar. 21, 1968, Ser. No. 715,055
Int. Cl. G01l 7/16; F01p 5/14
U.S. Cl. 73—419      8 Claims

ABSTRACT OF THE DISCLOSURE

A fluid pressure or flow-sensing apparatus is formed by a piston and a cylinder contained in a housing. The cylinder walls define a frustum of a cone and the piston has a cylindrical skirt. The closed end of the cylinder has fluid openings therethrough communicating with the one part of the housing connected to the high pressure side and the open end of the cylinder communicates with the second portion of the housing connected to the low pressure fluid side. The piston is affixed to an axial rod guided in the housing and the closed end of the cylinder. A spring is in compression between the closed end of the cylinder and an abutment on the rod in said one part of the housing to urge the piston towards the closed end of the cylinder. The rod is connected to a signaling device. The restriction of the flow in the space between the skirt and the cylinder walls results in a back pressure at the head of the piston which back pressure forces the piston in a direction out of the cylinder against the resistance of the spring.

BACKGROUND OF THE INVENTION

Fluid pressure or flow-sensing devices have many applications, as for example, in protective devices for internal combustion engines as shown in my prior Pat. 3,007,461. In one prior art type these take the form of diaphragms, bellows, or curved, resilient tubes which are moved to displaced positions as a result of varying pressured differentials that are present. These have various disadvantages including: they are subject to change and failure upon fatigue; and they become airbound in liquid systems, resulting in operative errors. Another prior art type is based on pressure changes across a venturi. These have the disadvantage that, particularly in automatic control apparatus, expensive instrumentation is required to obtain automatic readings of the pressure differentials, said instrumentation often involving the problems mentioned in connection with the previously referred to types.

The principal object of the present invention is to provide an apparatus that is relatively inexpensive to manufacture, will not change is characteristics after long periods of use, is readily adaptable to a wide variety of conditions, and overcomes the disadvantages mentioned in connection with prior art apparatus.

DESCRIPTION OF THE SPECIFIC EMBODIMENT

Figure 1:
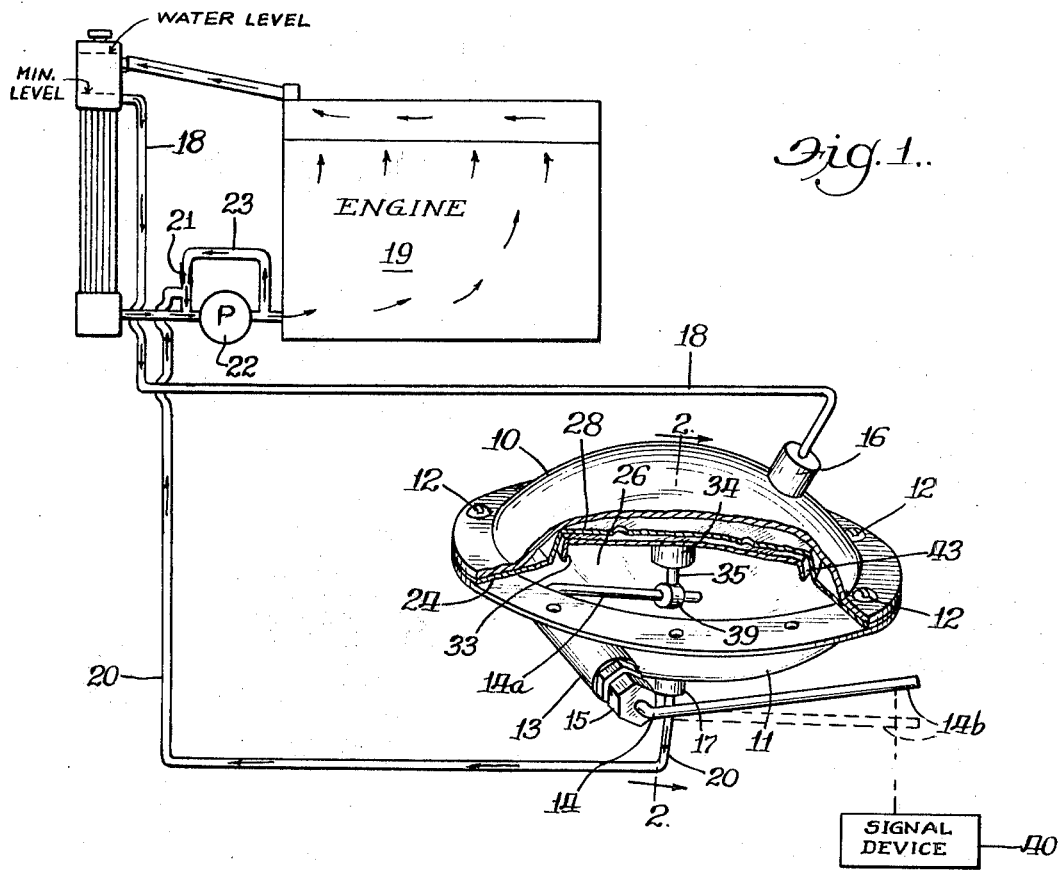
FIG. 1 illustrates in perspective an embodiment of the invention shown, schematically, connected to measure the operativeness of the coolant system of an internal combustion engine.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements.

The illustrated embodiment includes a hollow housing comprising an upper shell 10 and a lower shell 11 secured to each other by bolts 12. The lower shell has a boss 13 in which a signaling rod 14 is journaled. Suitable packing, held in place by packing nut 15, forms a fluid tight joint about rod 14. Upper shell 10 has a fluid connection 16 and lower shell 11 has a fluid connection 17. In the illustrated embodiment connection 16 has a pipe 18 leading to the point of minimum liquid level of the radiator of the coolant system of an internal combustion engine 19. A pipe 20 leads to the downstream end of a venturi 21 which communicates with the suction side of the coolant circulating pump 22. A pipe 23 connects the pressure side of pump 22 to the upstream end of venturi 21 and forms a shunt or bypass. Pipes 18, 20 and 23 are much smaller than the hose connections between the engine, radiator and pump.

Clamped between the two heads of the shell is a flange 24 of a stamped sheet metal part which divides the interior of the housing into a high pressure chamber 25 and a low pressure chamber 26. This sheet metal part has an internal truncated conical wall 27 and a planar end wall 28 which define a cylinder 29. End wall 28 has four fluid openings 30 therethrough. The area of said openings is at least as great, and preferably greater, than the cross sectional area of the space 43 between the piston skirt and the cylinder walls.

Within cylinder 29 is a piston having a head 32 and a skirt 33. Skirt 33 is cylindrical. Centrally located on head 32 is an integral boss 34 which is affixed to a rod 35 by means of a pressed fit. Rod 35 is journaled in end wall 28 and slidably guided in a boss 36 forming a part of upper shell 10. A spring 37 is in compression between end wall 28 and a pin 38 extending through rod 35 and forming an abutment thereon. Thus spring 37 urges rod 35 in an upwardly direction so that piston head 32 is urged toward the closed end of cylinder 29 as defined by end wall 28. Rod 35 has an annulus 39 through which extends arm 14a of signaling rod 14. External arm 14b of signaling rod 14 is operatively connected to a signaling device 40 which, for example, is an electrical switch connected in series with a light and a battery, which makes it responsive to the movement of the head 32.

The present invention always provides an annular space 43 between the piston skirt 33 and the wall 27 defining the sides of the cylinder. For any given application of the apparatus, the annular space 43 is proportioned so that the fluid resistance to flow therethrough will provide a back pressure in the portion of cylinder 29 between piston head 32 and the closed end of the cylinder as defined by wall 28; and the back pressure is sufficient to partially overcome the resistance of spring 37. Thus, the back pressure in the closed end of the cylinder forces head 32 of the piston away from wall 28. Through the connection with arm 14a of the signaling rod this is translated into movement of the signaling rod to actuate the signaling device 40. It may be translated into a go/ no-go signal through an electrical switch as described, or may be translated, as by means of a potentiometer, into a signal which is proportionate to the extent of movement of the piston. It may be desirable to have spring 37 connect to arm 14b (and the frame) to eliminate any lost motion due to tolerances, etc.

Figure 2:
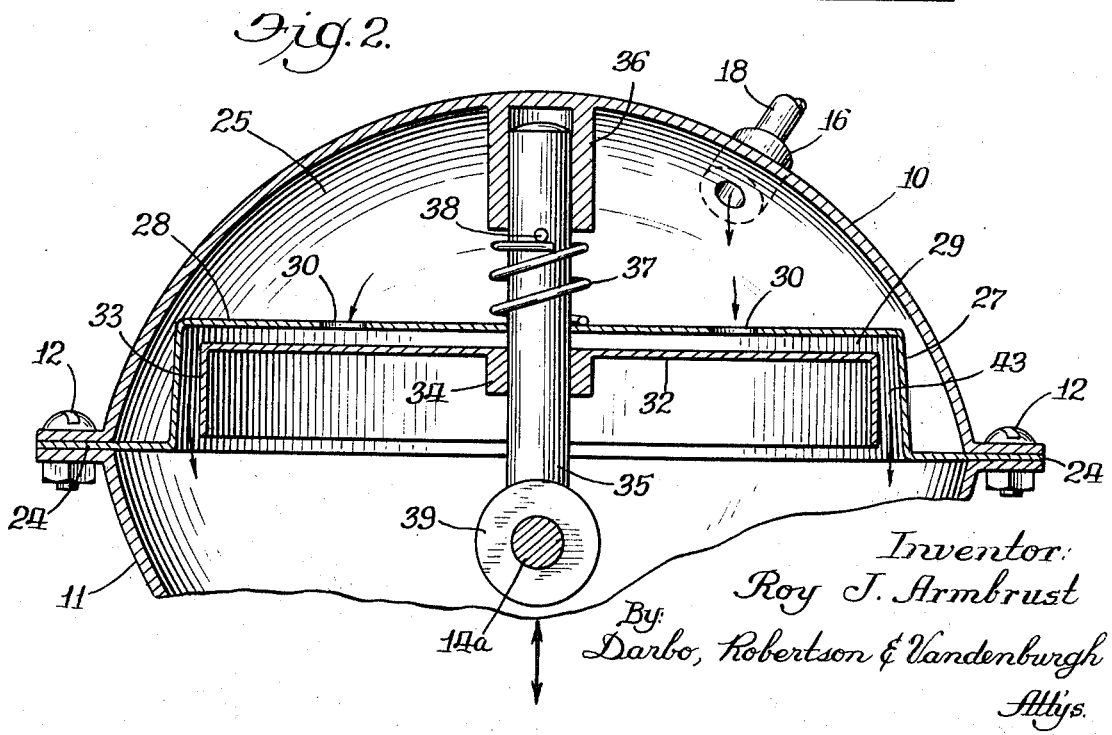
FIG. 2 is an enlarged section taken through the embodiment of FIG. 1 at lines 2—2.

As an illustration of a specific embodiment, the annular wall 27 has an internal height of 0.550 inch and has an internal diameter at the top (adjacent wall 28) of 3.325 inches. The wall 27 has an internal taper (half the central angle of the cone) of one degree. This taper is exaggerated in FIG. 2 for illustrative purposes. This taper provides for accurate centering of the piston without contact with the walls of the cylinder and reduces the fluid friction in annular space 43 as the piston moves farther out of the cylinder. The piston skirt has a total height from the face of the piston of 0.390 inch and an external diameter of 3.323 inches. This specific embodiment would be for the application illustrated in FIG. 1.

The size of annular space 43 would be proportioned according to the parameters involved in the application for the apparatus. For example, in a system wherein the apparatus was in parallel with the flow to be measured (as in the illustrated embodiment), the annular space 43 would be comparatively small. However, in systems wherein the apparatus was in series with the flow to be measured so that a substantial flow therethrough was desired the annular space 43 would be comparatively larger, retaining, in view of the parameters (pressure, fluid flow, etc.) involved, the space sufficiently small so that the resistance to flow therethrough would be created of a magnitude sufficient to develop a back pressure at the head of the piston to overcome the resistance of spring 37 in the range to be measured. This principle of operation should be distinguished from that wherein the moving fluid merely presses against a vane or flat plate positioned in the path of flow which operates as a result of the kinetic energy of the fluid acting on the vane or plate.

So long as the coolant system has an adequate amount of liquid, normally water, and pump 22 is operating properly, a comparatively low liquid pressure will be present in line 20. A higher liquid pressure will be present in line 18 so that there would then be a flow through the sensor in shell 10, 11. By creating a back pressure as previously described, this actuates the piston 32 to signal a satisfactory condition. The amount of liquid flow through venturi 21 is inconsequential as compared to or interfering with the normal coolant flow through the engine.

If the liquid level drops below a safe value, the upper end of tubing 18 is exposed to air and there will be no (or inadequate) liquid flow through the sensor. Thus, piston 32 will not be displaced and the signal device 40 will indicate the existance of an unsatisfactory condition. Similarly, if pump 22 is not operating to an extent to maintain a sufficiently low pressure at the donwstream end of venturi 21, piston 32 will not move to indicate proper operation through signal device 40.

I claim:

1. In a fluid pressure or flow sensing apparatus contained in a housing connected in a system having a portion in which the fluid pressure or flow is to be measured with one part of the interior of the housing communicating with the upstream side of said portion and a second part of the interior of the housing communicating with the downstream side of said portion, said apparatus having means dividing said two parts of the housing, said apparatus being used to actuate a signal device, the improvement comprising:
    said means having walls defining a cylinder with cylinder sides and a closed end and an open end of the cylinder with an opening through the closed end communicating with said one part of the housing interior to permit fluid to enter said cylinder from said one part, the open end communicating with the second part of the housing interior; and
    a piston in said cylinder, said piston having a skirt, the piston and skirt being spaced from the side walls of the cylinder, said piston being urged toward the closed end of the cylinder and being movable toward the open end, against said urging, by the back pressure on the piston resulting from fluid resistance to flow between the skirt and the side walls, said piston being operatively connected to said signal device;
    the communication between said one part and said portion being relatively equal in size to the communication between said second part and said portion so that the pressure in said one part and the pressure in said second part are equally representative of the upstream and downstream pressures respectively of said portion.

2. In an apparatus as set forth in claim 1, including a spring operatively connected to said piston and serving to do said urging of said piston toward said closed end.

3. In an apparatus as set forth in claim 2, wherein said cylinder has a longitudinal axis, and including a rod positioned parallel to said axis, said rod being affixed to said piston and extending through said closed end into said one part of the housing, said rod having an abutment in said one part spaced from the wall defining said closed end, said spring encircling said rod and in contact with said abutment and the wall defining said closed end, and means operatively connecting said rod and said signal device.

4. In an apparatus as set forth in claim 3, wherein said walls defining said cylinder sides form a frustum of a cone, and said skirt is cylindrical.

5. In an apparatus as set forth in claim 1, wherein said walls defining said cylinder sides form a frustum of a cone, and said skirt is cylindrical.

6. In an apparatus as set forth in claim 1, wherein said apparatus is connected in parallel with said portion of the system.

7. In an apparatus as set forth in claim 1,
    wherein the system is the coolant system of an internal combustion engine comprising:
        a radiator in which the coolant is to be maintained above a predetermined minimum level,
        a coolant pump having an intake connected to said radiator and a discharge connected to said engine, and
        a by-pass around said pump between said discharge and said intake, said by-pass having a venturi therein; and
    said apparatus comprising:
        a conduit connecting said one part to said radiator at a point just below said minimum level and forming said communication with said upstream side of said portion, and
        a conduit connecting said second part to said by-pass between said venturi and said intake and forming the communication with the downstream side of said portion.

8. In a flow and coolant level sensing apparatus for an internal combustion engine including a radiator in which the coolant is to be maintained above a predetermined minimum level, a coolant pump having an intake connected with said radiator and a discharge connected to said engine, said apparatus comprising:
- a by-pass around said pump between said discharge and said intake, said by-pass having a venturi therein;
- flow sensing means having an input connection, an output connection and internal fluid communication between said connections;
- a conduit connecting said input connection to said radiator just below said minimum level; and
- a conduit connecting said output connection to said by-pass between said venturi and said intake of said pump.

References Cited

UNITED STATES PATENTS

| | | | |
|---|---|---|---|
| 1,379,041 | 5/1921 | Pulliam | 92—209 |
| 2,661,713 | 12/1953 | Worel | 73—419 |
| 2,853,880 | 9/1958 | Redding | 73—419 |
| 3,007,461 | 11/1961 | Armbrust | 123—41.15 |

S. CLEMENT SWISHER, Primary Examiner

D. E. CORR, Assistant Examiner

U.S. Cl. X.R.

123—41.15